(12) United States Patent
Thorn

(10) Patent No.: US 11,734,417 B2
(45) Date of Patent: *Aug. 22, 2023

(54) AUTO-RECORDING OF MEDIA DATA

(71) Applicant: GoPro, Inc., San Mateo, CA (US)

(72) Inventor: Jonathan Leland Thorn, San Leandro, CA (US)

(73) Assignee: GoPro, Inc., San Mateo, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 17/353,195

(22) Filed: Jun. 21, 2021

(65) Prior Publication Data

US 2021/0312039 A1 Oct. 7, 2021

Related U.S. Application Data

(63) Continuation of application No. 16/299,508, filed on Mar. 12, 2019, now Pat. No. 11,042,632, which is a
(Continued)

(51) Int. Cl.
| | |
|---|---|
| *G06F 21/53* | (2013.01) |
| *G06F 21/55* | (2013.01) |
| *G06F 21/56* | (2013.01) |
| *G06F 3/048* | (2013.01) |
| *G06T 7/20* | (2017.01) |
| *G06V 40/20* | (2022.01) |
| *H04N 23/60* | (2023.01) |
| *H04N 23/66* | (2023.01) |

(Continued)

(52) U.S. Cl.
CPC ............... *G06F 21/53* (2013.01); *G06F 3/048* (2013.01); *G06F 21/554* (2013.01); *G06F 21/566* (2013.01); *G06F 21/567* (2013.01); *G06T 7/20* (2013.01); *G06V 40/23* (2022.01); *H04N 23/611* (2023.01); *H04N 23/64* (2023.01); *H04N 23/66* (2023.01); *H04N 23/667* (2023.01); *G06F 2221/033* (2013.01); *G06F 2221/2123* (2013.01)

(58) Field of Classification Search
CPC .......... G06F 21/53; G06F 21/55; G06F 21/56; G06F 3/048; G06K 9/00; G06T 7/20; H04N 5/232
USPC .................................................. 386/278, 292
See application file for complete search history.

(56) References Cited

U.S. PATENT DOCUMENTS 9,082,018 B1  7/2015 Laska
9,600,717 B1 * 3/2017 Dai ..................... G06V 20/47
(Continued)

OTHER PUBLICATIONS

International Preliminary Report on Patentability for App No. PCT/US2018/062222, dated Jun. 11, 2020, 8 pages.
(Continued)

*Primary Examiner* — Daquan Zhao
(74) *Attorney, Agent, or Firm* — Young Basile Hanlon & MacFarlane, P.C.

(57) ABSTRACT

An image capture system and methods for auto-recording media data are herein disclosed. A method includes selecting an activity-specific monitor based on an activity type. The activity-specific monitor defines one or more auto-recording conditions that, when satisfied, cause the image capture system to record data. The auto-recording conditions are based on an audio profile, a video profile, a motion profile, or any combination thereof. The auto-recording conditions include one or more scene descriptions that correspond to the activity type.

20 Claims, 7 Drawing Sheets

Related U.S. Application Data continuation of application No. 15/827,846, filed on Nov. 30, 2017, now Pat. No. 10,270,967.

(51) Int. Cl.
*H04N 23/611* (2023.01)
*H04N 23/667* (2023.01)

(56) References Cited

U.S. PATENT DOCUMENTS

| | | |
|---|---|---|
| 9,836,853 B1 | 12/2017 | Médioni |
| 9,934,823 B1 | 4/2018 | Bentley |
| 10,270,967 B1* | 4/2019 | Thorn .................... G06V 40/23 |
| 10,402,043 B1 | 9/2019 | Oddy |
| 11,042,632 B2 | 6/2021 | Thorn |
| 11,054,965 B2 | 7/2021 | Oddy |
| 2002/0191952 A1* | 12/2002 | Fiore ........................ H04N 5/76 386/355 |
| 2003/0007567 A1 | 1/2003 | Newman |
| 2008/0298796 A1 | 12/2008 | Kuberka |
| 2009/0015718 A1 | 1/2009 | Hirai |
| 2009/0083787 A1 | 3/2009 | Morris |
| 2009/0240431 A1 | 9/2009 | Chau |
| 2010/0171846 A1 | 7/2010 | Wood |
| 2012/0194631 A1 | 8/2012 | Venolia |
| 2013/0210563 A1 | 8/2013 | Hollinger |
| 2014/0181755 A1 | 6/2014 | Oh |
| 2015/0012827 A1 | 1/2015 | Elmeih |
| 2016/0029105 A1 | 1/2016 | Newman |
| 2016/0055381 A1 | 2/2016 | Adsumilli |
| 2016/0092737 A1 | 3/2016 | Laska |
| 2016/0313903 A1 | 10/2016 | Rabinovitz |
| 2016/0321506 A1* | 11/2016 | Fridental ............ H04N 21/4788 |
| 2016/0321841 A1 | 11/2016 | Christen |
| 2017/0017855 A1 | 1/2017 | Karsh |
| 2017/0076565 A1 | 3/2017 | Saboune |
| 2017/0249009 A1 | 8/2017 | Parshionikar |
| 2018/0182168 A1 | 6/2018 | Laurent |
| 2018/0210542 A1 | 7/2018 | McLean |
| 2019/0072407 A1 | 3/2019 | Fang |
| 2019/0213324 A1 | 7/2019 | Thorn |
| 2019/0289419 A1 | 9/2019 | Eronen |
| 2019/0317657 A1 | 10/2019 | Oddy |

OTHER PUBLICATIONS

International Search Report and Written Opinion for PCT/US2018/062222 dated Feb. 12, 2019, 11 pages.
U.S. Appl. No. 15/673,915, filed Aug. 10, 2017. 55 pages.

* cited by examiner

AUTO-RECORDING OF MEDIA DATA

CROSS-REFERENCE TO RELATED APPLICATION(S)

This application is a continuation of U.S. patent application Ser. No. 16/299,508, filed Mar. 12, 2019, which is a continuation of U.S. patent application Ser. No. 15/827,846, filed Nov. 30, 2017, now U.S. Pat. No. 10,270,967, the entire disclosures of which are hereby incorporated by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to methods and systems for automatically recording of media data captured by an image capture system.

BACKGROUND

Image capture devices, such as cameras, may capture content, media data including image data, video data, and audio data. Increasingly, consumers are looking for image capture devices that are increasingly versatile. Consumers want image capture devices that can capture moments that were traditionally not convenient for photography and/or videography. As such, image capture devices are being designed to be worn or mounted to the body or equipment. In this way, users can use their image capture devices to capture activities such as snowboarding, skiing, scuba diving, parachuting, kayaking, cliff jumping, motor-biking, and the like.

SUMMARY

According to some implementations of the present disclosure, a method for auto-recording media data captured by an image capture system including an image capture device is disclosed. The method includes capturing data, for example, by the image capture device. The data may include video data, audio data, or both. The method may include selecting an activity-specific monitor from a plurality of activity-specific monitors based on an activity type. Each of the plurality of activity-specific monitors may correspond to a respective activity type and define sensor data to monitor and one or more auto-recording conditions. The method may include executing the selected activity-specific monitor. The activity-specific monitor may receive sensor data from one or more sensors; determine whether the one or more auto-recording conditions defined by the activity-specific monitor are met by the sensor data; and when the one or more auto-recording conditions are met, storing a portion of the data captured.

According to some implementations of the present disclosure, an image capture system that includes an image capture device is presented. The image capture system may include an image sensor that captures video data, an audio component that captures audio data, a persistent storage that stores computer-readable data, one or more processors that execute computer-executable instructions, or any combination thereof. The computer executable instructions may cause the one or more processors to capture data. The data may include video data captured by the image sensor of the image capture device, audio data captured by the audio component of the image capture device, or both. The computer executable instructions may cause the one or more processors to temporarily store the data, for example in a memory cache. The computer executable instructions may cause the one or more processors to select an activity-specific monitor from a plurality of activity-specific monitors based on the activity type. Each of the plurality of different activity-specific monitors may correspond to a respective activity type and define sensor data to monitor and one or more auto-recording conditions that, when satisfied based on the sensor data, cause the image capture system to store the captured data in the persistent storage. The computer executable instructions may cause the one or more processors to execute the selected activity-specific monitor. The activity-specific monitor may be adapted to receive current sensor data from the one or more sensors, determine whether the one or more auto-recording conditions defined by the activity-specific monitor are met by the current sensor data, output a notification indicating that the one or more auto-recording conditions are met upon determining that the one or more auto-recording conditions are met, or any combination thereof. The computer executable instructions may cause the one or more processors to write a portion of the data captured after the auto-recording conditions are met to the persistent storage based on receipt of the notification. The portion of the data captured may include at least a portion of the data stored in the memory cache.

According to some implementations of the present disclosure, an image capture device may include an image sensor, an audio component, a persistent storage, a memory device, a processor, or any combination thereof. The memory device may be configured to store a plurality of activity-specific monitors. Each of the plurality of activity-specific monitors may be encapsulated in a respective object. Each of the plurality of activity-specific monitors may correspond to a respective activity type. Each of the plurality of activity-specific monitors may define sensor data to monitor. Each of the activity-specific monitors may define an auto-recording condition that, when satisfied based on the sensor data, cause the image capture system to store captured data in the persistent storage. The processor may be configured to execute computer-executable instructions. The computer executable instructions may cause the processor to obtain data. The data may include video data captured by the image sensor of the image capture device, audio data captured by the audio component of the image capture device, or both. The processor may select an activity-specific monitor based on the activity type. The processor may retrieve an object encapsulating the selected activity-specific monitor from the memory device. The processor may instantiate an instance of the selected activity-specific monitor based on the object encapsulating the selected activity-specific monitor. The instance of the selected activity-specific monitor may be configured to determine whether the one or more auto-recording conditions defined by the activity-specific monitor are met, output a notification indicating that the one or more auto-recording conditions are met, or both. The processor may be configured to write portions of the data captured to the persistent storage.

In an aspect, a method may include detecting audio data. The method may include selecting an activity-specific monitor from one or more activity-specific monitors based on an activity type. The selected activity-specific monitor includes an auto-recording condition based on an audio profile associated with the activity type. The method may include determining whether the audio data corresponds to the audio profile associated with the activity type. If the audio data corresponds to the audio profile, the method may include determining that the auto-recording condition is met and transmit a notification to begin auto-recording data.

In an aspect, an image capture system may include an image sensor and a processor. The image sensor may be configured to obtain video data. The processor may be configured to select an activity-specific monitor from one or more activity-specific monitors based on an activity type. The selected activity-specific monitor may include an auto-recording condition. The auto-recording condition may be based on a video profile associated with the activity type. The processor may be configured to determine whether the video data corresponds to the video profile. If the video data corresponds to the video profile, the processor may be configured to determine that the auto-recording condition is met and transmit a notification to begin auto-recording data.

In an aspect, an image capture device may include an image sensor, an audio component, and a processor. The image sensor may be configured to obtain video data. The audio component may be configured to detect audio data. The processor may be configured to select an activity-specific monitor based on an activity type. The selected activity-specific monitor may include an auto-recording condition. The auto-recording condition may be based on a video profile, an audio profile, or both. The processor may be configured to determine whether the video data corresponds to the video profile. The processor may be configured to determine whether the audio data corresponds to the audio profile. If the video data corresponds to the video profile and the audio data corresponds to the audio profile, the processor may be configured to transmit a notification to begin auto-recording data.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular forms of "a," "an," and "the" include plural referents unless the context clearly dictates otherwise.

BRIEF DESCRIPTION OF THE DRAWINGS

The disclosed embodiments have other advantages and features which will be more readily apparent from the detailed description, the appended claims, and the accompanying figures. A brief introduction of the figures is below.

Figure 1A:
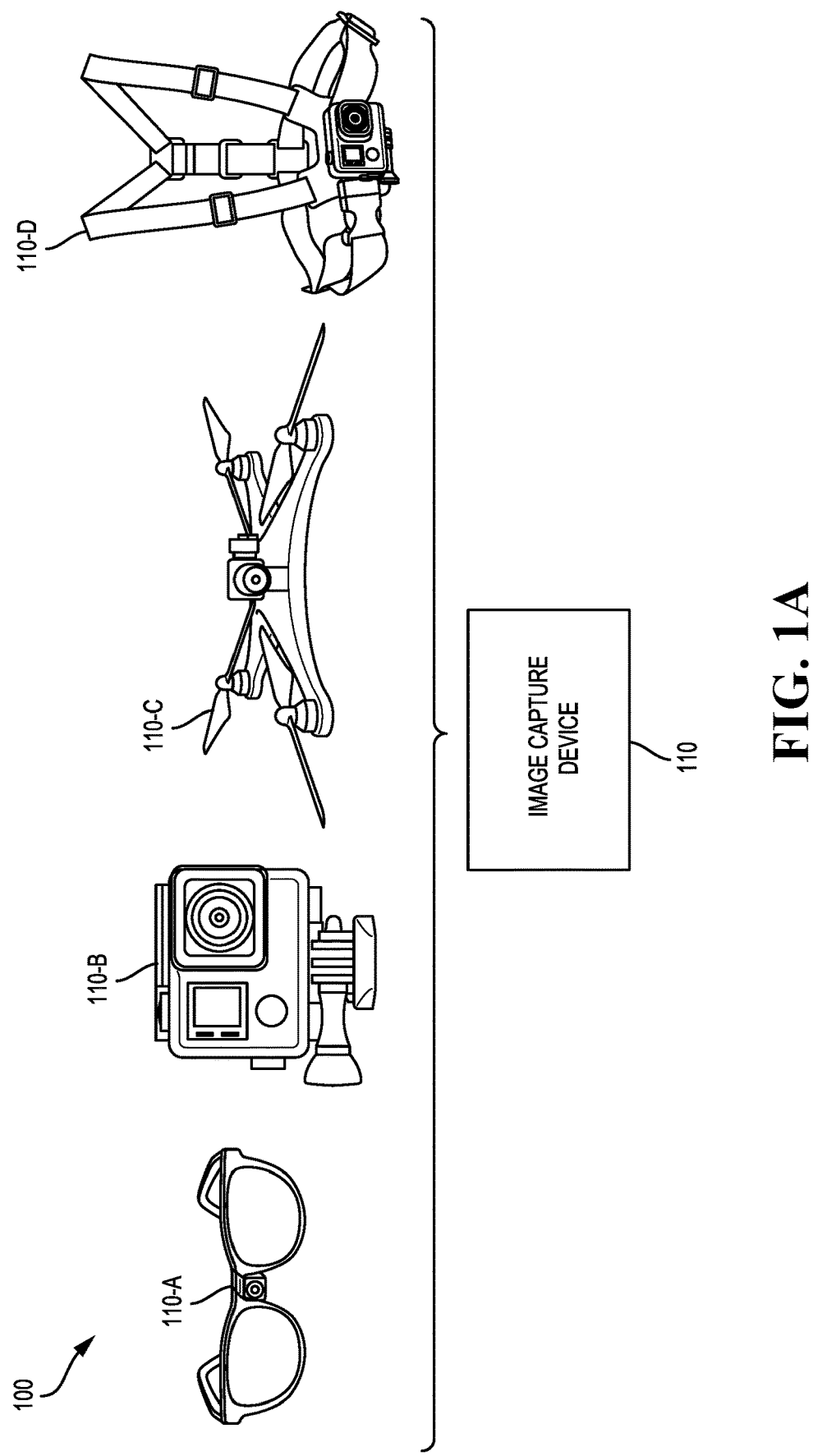
FIG. 1A is a schematic illustrating an example of an image capture system according to some implementations of the present disclosure.

All figures disclosed herein are © Copyright 2021 GoPro Inc. All rights reserved.

DETAILED DESCRIPTION

Implementations of the present technology will now be described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements.

As image capture devices are becoming more versatile, users of these image capture devices are using image capture devices to capture extreme moments. Image capture devices can be mounted to equipment and/or can be worn on the body of a user. One issue that arises is that a user may be participating in an activity that requires concentration and cannot be burdened with managing the operation of the image capture device. For example, a user that is skiing may not be able to push the record button on a camera while in the act of skiing. On the other hand, pressing "record" before the user starts the activity may result in the persistent storage of the image capture device (or a secondary device) filling up with unnecessary footage. This both drains the storage resources of the image capture device (or a connected secondary device) and is inconvenient to the user, who may have to review many hours of footage to find the moments they wanted to capture.

The present disclosure is directed to an image capture system that is configured to automatically record ("auto-record") media data when the image capture system determines that the user is engaging in a particular activity. As used herein, media data can refer to video data and/or audio data. In some implementations, media data may also include image data (e.g., photographs). The image capture system may be configured to receive an activity type selection from a user that indicates an activity type that the user is going to participate in. Upon enabling the auto-recording feature (which may be activated by the selection of the activity type), the image capture system can begin capturing media data and temporarily storing the media data in a memory cache. The memory cache may store a limited amount of data (e.g., three to five second of video/audio) in a first-in-first-out manner. Furthermore, upon receiving an activity type selection, the image capture device may select and begin executing an activity-specific monitor. An activity-specific monitor may be a set of computer-executable instructions that cause the image capture system to monitor sensor data obtained from one or more sensors, which may include an image sensor, to determine if one or more auto-recording conditions are met. An auto-recording condition may define conditions that relate to an activity, including but not limited to, a scene description, one or more measurement thresholds, and an audio profile. A scene description may describe one or more features that can be observed in captured video data that corresponds to the activity type selected by the user. Measurement thresholds may define thresholds for specific sensor data readings, whereby the thresholds correspond to features of the activity type selected by the user. Audio profiles describe one or more features that can be observed in captured audio data that correspond to the activity type of the selected user. Upon determining that the auto-recording conditions are all met, the activity-specific monitor issues a notification to the image capture device to begin recording the captured media data. In response, the image capture device begins storing the captured video data and/or audio data in persistent storage. In this way, the user may have a hands-free experience, can reduce the amount of data that is stored in persistent storage, and can easily find moments of captured media data that are relevant to the activity in which the user engaged.

In some implementations, each activity-specific monitor may be encapsulated in a respective object and stored in the memory of the image capture system. In this way, the image capture system can instantiate an instance of an activity-specific monitor corresponding to the selected activity. In these implementations, a manufacturer of the image capture system (or any other suitable party), can easily update the image capture system with new activity-specific monitors, thereby increasing the number of activity types that can be auto-recorded, even after the manufacture of the image capture system.

FIG. 1A illustrates an example of an image capture system 100 configured to capture media data in accordance with some implementations of this disclosure. As shown in FIG. 1A, an image capture system 100 includes an image capture device 110. An image capture device 110 may be any form factor device. An image capture device 110 may be implemented in the form of a glasses/sunglasses video camera 110-A, a handheld/mountable camera 110-B, a drone system camera 110-C, a wearable camera 110-D, or any other suitable format (e.g., a spherical camera, a mobile device camera, or a traditional video camera). The form factors depicted in FIG. 1A are provided for example only, and the image capture system 100 may be implemented in any other suitable form factor. In the implementations of FIG. 1A, the image capture device 110 may include persistent storage and a user interface with which the user can interact. The user interface may be physical, graphical, or speech-based.

Figure 1B:
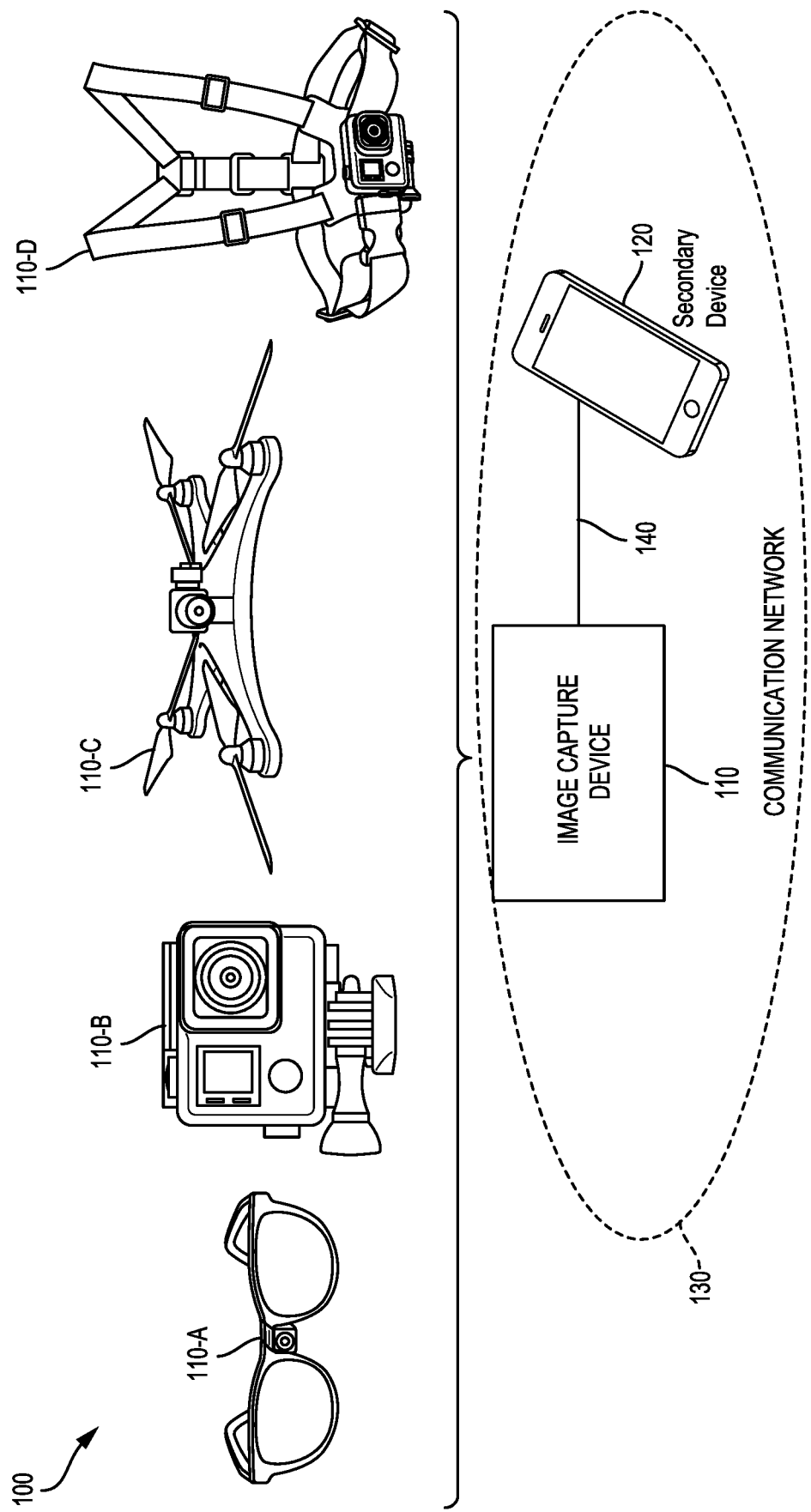
FIG. 1B is a schematic illustrating an example of an image capture system according to some implementations of the present disclosure.

FIG. 1B illustrates an example of an image capture system 100 configured to capture media data in accordance with some implementations of this disclosure. In the image capture system 100 of FIG. 1B, the image capture device 110 communicates with a secondary device 120 via a communication network 130. The secondary device 120 may be any suitable computing device, including but not limited to a smartphone, a tablet computer, a phablet, a smartwatch, a portable computer, and/or another device or combination of. In the implementations of FIG. 1B, the image capture device 110 may not have the requisite resources to store media data, or may not have the requisite resources to interface with the user (e.g., no display to present a graphical user interface). Thus, in these communications, the secondary device 120 may allow the image capture device 110 to access to the permanent storage residing on the secondary device 120 via the communication network and to write media data thereto. Additionally or alternatively, the secondary device 120 may provide a user interface that allows the user to control the image capture device 110 via the communication network 130. For example, the secondary device 120 may present a graphical user interface via a touch screen of the secondary device 120. In these implementations, the user may input commands to the secondary device 120, which in turn transmits the commands to the image capture device 110. Similarly, the image capture device 110 may transmit data to the secondary device 120, which the secondary device 120 can display to the user via its user interface.

The communication network 130 may refer to any electronic communication network that facilitates wired or wireless communication between the image capture system 100 and the secondary device 120 via a communication link 140. The communication network may be a local area network (LAN), a wireless local area network (WLAN), or a personal area network (PAN). In some implementations, the communication network 130 may include a wireless link 140, such as a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the communication network 130 may include a wired link 140, such as an HDMI link, a USB link, a digital video interface link, a display port interface link, such as a Video Electronics Standards Association (VESA) digital display interface link, an Ethernet link, a Thunderbolt link, and/or other wired computing communication link 140.

Although not expressly shown in FIGS. 1A and 1B, in some implementations, an image capture device 110 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors. Although not expressly shown in FIGS. 1A and 1B, in some implementations, an image capture device 110 may include one or more microphones, which may receive, capture, and record audio information, which may be associated with images acquired by the image sensors. Although not expressly shown in FIGS. 1A and 1B, the image capture system 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the secondary device 120 may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 110.

It is noted that the image capture systems 100 of FIGS. 1A and 1B are provided for example only. The techniques described herein may be applied in any image capture system 100 that is configured to record media data.

Figure 2:
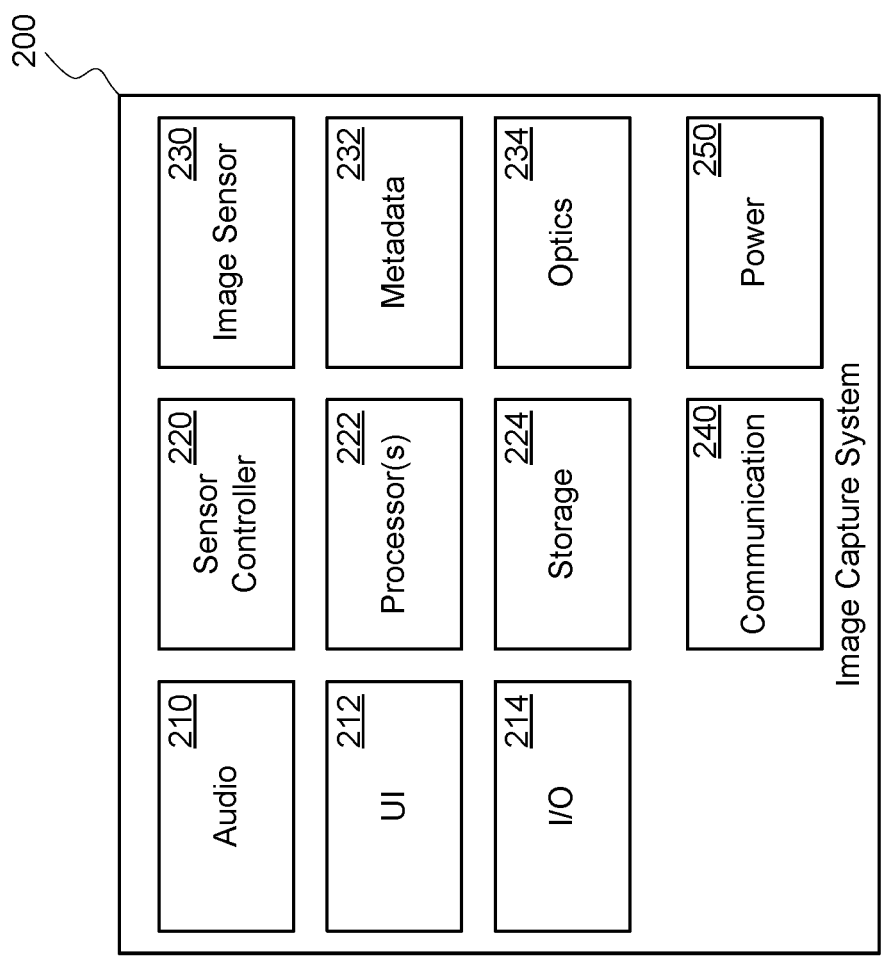
FIG. 2 is a schematic illustrating an example set of components of an image capture device according to some implementations of the present disclosure.

FIG. 2 is a block diagram of an example image capture system 200 in accordance with implementations of this disclosure. In some implementations, the image capture system 200 is the image capture system 100 of FIG. 1A or 1B. The image capture system 200 may include an audio component 210, a user interface (UI) unit 212, an input/output (I/O) unit 214, a sensor controller 220, one or more processors 222, an electronic storage unit 224, an image sensor 230, a metadata unit 232, an optics unit 234, a communication unit 240, a power system 250, or a combination thereof. The components thereof may be incorporated wholly on an image capture device or distributed across an image capture device and one or more secondary devices.

In some implementations, the audio component 210, which may include one or more microphones, may receive, sample, capture, record, or a combination thereof audio data, such as sound waves, which may be associated with, such as stored in association with, image or video content contemporaneously captured by the image capture system 200. In some implementations, audio data may be encoded using, e.g., Advanced Audio Coding (AAC), Audio Compression-3 (AC3), Moving Picture Experts Group Layer-3 Audio (MP3), linear Pulse Code Modulation (PCM), Motion Picture Experts Group-High efficiency coding and media delivery in heterogeneous environments (MPEG-H), and/or other audio coding formats (audio codecs). In one or more implementations, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the UI 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the UI 212 may include a display, one or more tactile elements (e.g., buttons and/or virtual touch screen buttons), lights (LEDs), speakers, and/or other user interface elements. The UI 212 may receive user input and/or provide information to a user related to the operation of the image capture system 200.

In some implementations, the UI 212 may include a display unit that presents information related to camera control or use, such as operation mode information (e.g., image resolution, frame rate, capture mode, sensor mode, video mode, photo mode), connection status information (e.g., connected, wireless, wired connection), power mode information (e.g., standby mode, sensor mode, video mode), information related to other information sources (e.g., heart rate, GPS), and/or other information.

In some implementations, the UI 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press (pulse width modulation), a number of button presses (pulse code modulation), or a combination thereof. In an example, a sensor acquisition mode may be initiated in response to detecting two short button presses. In another example, the initiation of a video mode and cessation of a photo mode, or the initiation of a photo mode and cessation of a video mode, may be triggered (toggled) in response to a single short button press. In another example, video or photo capture for a given time duration or a number of frames (burst capture) may be triggered in response to a single short button press. Other user command or communication implementations may also be implemented, such as one or more short or long button presses.

In some implementations, the I/O unit 214 may synchronize the image capture device with other cameras and/or with other external devices, such as a remote control, a second image capture device, a smartphone, a user interface device, such as the secondary device shown in FIG. 1, and/or a video server. The I/O unit 214 may communicate information between I/O components. In some implementations, the I/O unit 214 may be connected to the communication unit 240 to provide a wired and/or wireless communications interface (e.g., Wi-Fi, Bluetooth, USB, HDMI, Wireless USB, Near Field Communication (NFC), Ethernet, a radio frequency transceiver, and/or other interfaces) for communication with one or more external devices, such as a user interface device, such as the secondary device shown in FIG. 1, or another metadata source. In some implementations, the I/O unit 214 may interface with LED lights, a display, a button, a microphone, speakers, and/or other I/O components. In some implementations, the I/O unit 214 may interface with an energy source, e.g., a battery, and/or a Direct Current (DC) electrical source.

In some implementations, the I/O unit 214 of the image capture device may include one or more connections to external computerized devices for configuration and/or management of remote devices, as described herein. The I/O unit 214 may include any of the wireless or wireline interfaces described herein, and/or may include customized or proprietary connections for specific applications.

In some implementations, the sensor controller 220 may operate or control the image sensor 230, such as in response to input, such as user input. In some implementations, the sensor controller 220 may receive image and/or video input from the image sensor 230 and may receive audio information from the audio component 210.

In some implementations, the processor(s) 222 may include a system on a chip (SOC), microcontroller, microprocessor, CPU, DSP, application-specific integrated circuit (ASIC), GPU, and/or other processor that may control the operation and functionality of the image capture device. In some implementations, the processor(s) 222 may interface with the sensor controller 220 to obtain and process sensory information for, e.g., object detection, face tracking, stereo vision, and/or other image processing.

In some implementations, the sensor controller 220, the processor(s) 222, or both may synchronize information received by the image capture system 200. For example, timing information may be associated with received sensor data, and metadata information may be related to content (photo/video) captured by the image sensor 230 based on the timing information. In some implementations, the metadata capture may be decoupled from video/image capture. For example, metadata may be stored before, after, and in-between the capture, processing, or storage of one or more video clips and/or images.

In some implementations, the sensor controller 220, the processor(s) 222, or both may evaluate or process received metadata and may generate other metadata information. For example, the sensor controller 220 may integrate the received acceleration information to determine a velocity profile for the image capture system 200 concurrent with recording a video. In some implementations, video information may include multiple frames of pixels and may be encoded using an encoding method (e.g., H.265, H.264, CineForm, and/or other codec).

Although not shown separately in FIG. 2, one or more of the audio component 210, the UI 212, the I/O unit 214, the sensor controller 220, the processor 222, the electronic storage unit 224, the image sensor 230, the metadata unit 232, the optics unit 234, the communication unit 240, or the power systems 250 of the image capture system 200 may communicate information, power, or both with one or more other units, such as via an electronic communication pathway, such as a system bus. For example, the processor 222 may interface with the audio component 210, the UI 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a GPS receiver may include a processing apparatus that may provide position and/or motion information to the processor 222 in accordance with a defined schedule (e.g., values of latitude, longitude, and elevation at 10 Hz).

In some implementations, the electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222 may execute the instruction to perform one or more, or portions of one or more, of the operations described herein. The electronic storage unit 224 may include storage memory for storing content (e.g., metadata, images, audio) captured by the image capture system 200. As used herein, the term "memory" includes any type of integrated circuit or other storage device adapted for storing digital data, including, without limitation, read-only memory (ROM), programmable ROM (PROM), electrically erasable PROM (EEPROM), dynamic random access memory (DRAM), Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory, such as NAND/NOR, memristor memory, and pseudo SRAM (PSRAM).

In some implementations, the electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type (video, still images), image resolution, frame rate, burst setting, white balance, recording configuration (e.g., loop mode), audio track configuration, and/or other parameters that may be associated with audio, video, and/or metadata capture. In some implementations, the electronic storage unit 224 may include memory that may be used by other hardware/firmware/software elements of the image capture system 200.

In some implementations, the image sensor 230 may include one or more of a charge-coupled device sensor, an active pixel sensor, a complementary metal-oxide semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information.

In some implementations, the image sensor 230 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

In some implementations, the metadata unit 232 may include metadata sensors such as an IMU, which may include one or more accelerometers and/or gyroscopes, a magnetometer, a compass, a GPS sensor, an altimeter, an ambient light sensor, a temperature sensor, biometric sensor (e.g., a heartrate monitor) and/or other sensors or combinations of sensors. In some implementations, the image capture system 200 may contain one or more other metadata/telemetry sources, e.g., image sensor parameters, battery monitor, storage parameters, and/or other information related to camera operation and/or capture of content. The metadata unit 232 may obtain information related to the environment of the image capture system 200 and aspects in which the content is captured.

For example, the metadata unit 232 may include an accelerometer that may provide device motion information including velocity and/or acceleration vectors representative of motion of the image capture system 200. In another example, the metadata unit 232 may include a gyroscope that may provide orientation information describing the orientation of the image capture system 200. In another example, the metadata unit 232 may include a GPS sensor that may provide GPS coordinates, time, and information identifying a location of the image capture system 200. In another example, the metadata unit 232 may include an altimeter that may obtain information indicating an altitude of the image capture system 200.

In some implementations, the metadata unit 232, or one or more portions thereof, may be rigidly coupled to the image capture device or a secondary device, such that motion, changes in orientation, or changes in the location of the image capture system 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a GPS unit as a second physical unit. In some implementations, the metadata unit 232, or one or more portions thereof, may be included in an image capture device, or may be included in a physically separate unit such as a secondary device.

In some implementations, the optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, such as a housing.

In some implementations, the communication unit 240 may be coupled to the I/O unit 214 and may include a component (e.g., a dongle) having an infrared sensor, a radio frequency transceiver and antenna, an ultrasonic transducer, and/or other communications interfaces used to send and receive wireless communication signals. In some implementations, the communication unit 240 may include a local (e.g., Bluetooth, Wi-Fi) and/or broad range (e.g., cellular LTE) communications interface for communication between the image capture system 200 and a remote device (e.g., the secondary device in FIG. 1). The communication unit 240 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture system 200 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 250 supply power to the image capture device. For example, for a small-sized, lower-power action camera a wireless power solution (e.g., battery, solar cell, inductive (contactless) power source, rectification, and/or other power supply) may be used.

Consistent with the present disclosure, the components of the image capture system 200 may be remote from one another and/or aggregated. For example, one or more sensor components may be distal from the image capture device 110, e.g., such as shown and described with respect to FIG. 1B.

Figure 3:
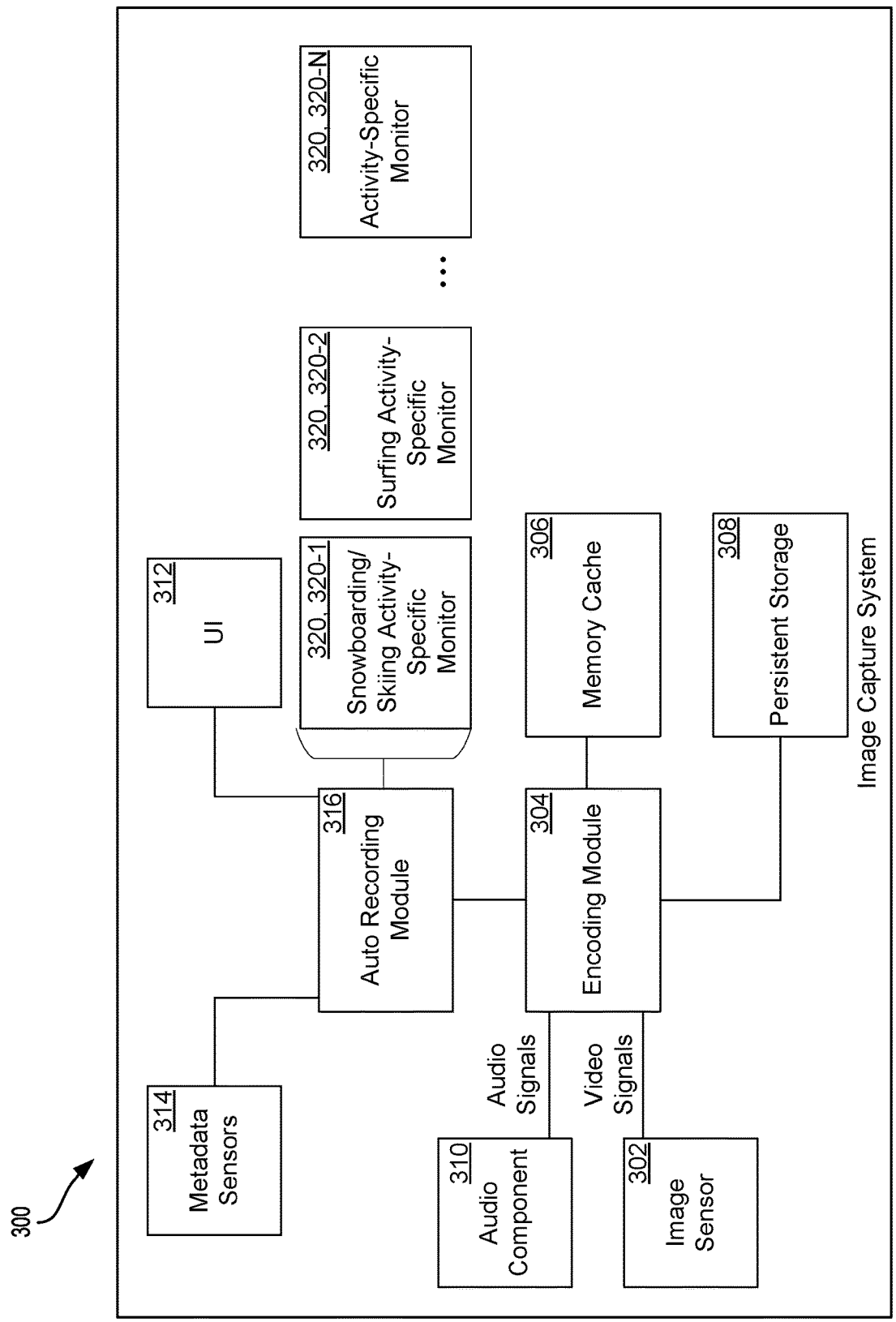
FIG. 3 is a schematic illustrating an image capture system configured to automatically record segments of media data according to some implementations of the present disclosure.

FIG. 3 illustrates an example of an image capture system 300 configured to automatically record segments of media data. As mentioned, media data may refer to video data and/or audio data. The image capture system 300 may be the image capture systems 100, 200 of FIGS. 1A, 1B, and/or 2. The image capture system 300 may include an image sensor 302, an encoding module 304, a memory cache 306, persistent storage 308, an audio component 310, a UI 312, metadata sensors 314, and an auto-recording module 316. In operation, the image capture system 300 may execute one or more activity-specific monitors 320 selected from a plurality of activity-specific monitors 320-N. For example, the image capture system 300 may execute a snowboarding/skiing activity-specific monitor 320-1, a surfing activity-specific monitor 320-2, and/or other suitable activity-specific monitors (which may be generically referred to as an activity-specific monitor 320). As discussed with FIGS. 1A and 1B, the image capture system 300 may be housed in a single device or may be distributed across two or more devices (e.g., an image capture device and a connected secondary device with persistent storage capabilities).

The image sensor 302, the audio component 310, the UI 312, and the metadata sensors 314 may correspond to the image sensor 230, the audio component 210, the UI 212, and the metadata sensors 232 of FIG. 2. The memory cache 306 and/or the persistent storage 308 may be implemented in memory or storage, such as storage unit 224 of FIG. 2. The encoding module 304 may include video encoders and/or audio encoders. The encoding module 304 may implement any suitable codecs, as was described with respect to FIG. 2. For example, a video encoder may implement H.265, H.264, CineForm, and/or any other suitable codec. Similarly, an audio encoder may implement Advanced Audio Coding (AAC), Audio Compression-3 (AC3), Moving Picture Experts Group Layer-3 Audio (MP3), linear Pulse Code Modulation (PCM), Motion Picture Experts Group-High efficiency coding and media delivery in heterogeneous environments (MPEG-H), and/or any other suitable audio codecs.

In operation, the auto-recording module 316 receives the activity type selection and selects an activity-specific monitor 320 based on the activity type defined by the activity type selection. The auto-recording module 316 is configured to receive an activity type selection from a user via the UI 312. The activity type selection indicates an activity type that the user plans to engage in. Examples of activity types may include snowboarding/skiing, snorkeling/scuba diving, skydiving/wingsuit diving/base jumping, kayaking/rafting, driving a motorcycle, motor biking, mountain biking, roller blading, or the like. As mentioned, in some implementations, the UI 312 may be provided by a secondary device (e.g., a smartphone or smartwatch) that is in operative communication with the image capture device. In other implementations, the UI 312 may be provided by the image capture device itself.

In some implementations, the auto-recording module 316 may instruct the image sensor 302 to begin capturing media data and to write the media data to the memory cache 306 upon the user initiating the auto-recording feature (e.g., by selecting an activity type). As the media data is captured, the encoding module 304 may encode the media data (e.g., video data and/or audio data) and may write the encoded media data to the memory cache 306. The memory cache 306 may store the most recently captured media data (e.g., three to five seconds of media data) in a first-in-first-out manner. Thus, the memory cache 306 may store, for example, three to five seconds of the most recently captured video data and/or audio data.

Upon receiving the activity type selection, the auto-recording module 316 may select an activity-specific monitor 320 from a plurality of activity-specific monitors 320. In some implementations, an activity-specific monitor 320 is a set of computer-readable instructions that define a set of one or more sensors to monitor and one or more auto-recording conditions. The auto-recording conditions define logic or rules, that when collectively satisfied, cause the auto-recording module 316 to begin recording the media data being captured by the image sensor 302 and/or the audio component 310. Each auto-recording condition may define sensor data from one or more sensors for the activity-specific monitor 320 to monitor.

For example, a snowboarding/skiing activity-specific monitor 320-1 may monitor the video data captured by the image sensors 302 to determine whether the image contained in the video data matches a scene description corresponding to a snow-related scene. For example, the snowboarding/skiing activity-specific monitor 320-1 may examine the pixel values of pixels at predetermined pixel locations to determine whether the captured video data corresponds to a snow-related scene. If the snowboarding/skiing activity-specific monitor 320-1 detects a match or correspondence between the captured video data and the scene description, the snowboarding/skiing activity-specific monitor 320-1 may monitor the metadata sensors 314 (e.g., gyroscope, accelerometers, GPS sensors) to determine if the motion of the image capture system 300 (which may include the subject) is consistent with that of a skier/snowboarder. For example, if the measured acceleration is greater than an acceleration threshold (e.g., 1.5 m/s/s), the snowboarding/skiing activity-specific monitor 320-1 determines that the motion is consistent with that of an active skier/snowboarder. The snowboarding/skiing activity-specific monitor-A 320 may also monitor the audio component 310 to determine if the audio data being captured with the video data matches an audio profile of a snowboarding/skiing scenario. For example, if the frequencies captured in the audio data are consistent with the sound of wind being captured by an audio component 310 (upon also determining that the video data matches a snowboarding/skiing scene and the acceleration is greater than a threshold), the snowboarding/skiing activity-specific monitor 320-1 may determine that the user is likely participating in the specified activity and may issue a notification to the auto-recording module to begin recording the captured media data. In this scenario, the auto-recording module 316 may begin writing the media data into persistent storage 308.

In some implementations, the auto-recording module 316 may execute the selected activity-specific monitor 320. Once executing, the activity-specific monitor 320 may begin monitoring sensor data in a manner that is defined in the activity-specific monitor 320. As discussed, the snowboarding/skiing activity-specific monitor 320-1 may monitor sensor data from one or more sensors for specific conditions that tend to correlate to an active snowboarder or skier, while a surfing activity-specific monitor 320-2 may monitor sensor data from one or more sensors for other specific conditions that tend to correlate to an active surfer. If those conditions are met, the activity-specific monitor 320 may issue a notification to the auto-recording module 316 indicating that the conditions were met. In response to receiving the notification, the auto-recording module 316 instructs the encoding module 304 to output the video data/audio data to the persistent storage 308. Furthermore, in some implementations, the auto-recording module 316 may instruct or cause the memory cache 306 to copy the cached media data into the persistent storage 308 as well.

The encoded media data may be written to the persistent storage 308 until the auto-recording module 316 instructs the encoding module 304 to stop the auto-recording. In some implementations, the auto-recording module 316 records media segments that are equal to or less than a predetermined length (e.g., 30 seconds), so as to facilitate uploading the media data to social networking and/or video sharing platforms. In some implementations, the auto-recording module 316 may capture multiple media segments and may combine the multiple media segments into a single media segment that is less than or equal to a predetermined length. In other implementations, the auto-recording module 316 awaits a stop notification from the activity-specific monitor 320. A stop notification may instruct the auto-recording module 316 to stop the auto-recording feature. The activity-specific monitor 320 may issue a stop notification, for example, when one or more specific auto-recording conditions are no longer being met or a stop condition is met. For instance, if the motion data obtained from the metadata sensor(s) 314 indicates that the user is no longer moving (e.g., negative acceleration followed by zero or near zero velocity), the activity-specific monitor 320 may issue a stop notification to the auto-recording module 316. In response to the stop notification, the auto-recording module 316 may instruct the encoding module 304 to stop writing the media data to the persistent storage 308. In response to the stop notification, the image sensor 302 and/or the audio component 310 may stop capturing the media data. Alternatively, the auto-recording module 316 may instruct the encoding module 304 to stop writing to the persistent storage 308 and to begin writing the media data to the memory cache 306.

With respect to the activity-specific monitors 320, the activity-specific monitors 320 may be implemented in any suitable manner. In some implementations, the various activity-specific monitors 320 may be incorporated as part of the auto-recording module 316 or as functions called by the auto-recording module 316.

In some implementations, each activity-specific monitor 320 may be encapsulated in a respective object and stored in the memory of the image capture system 300. In these implementations, the auto-recording module 316, in response to receiving an activity type selection, may instantiate an instance of an activity-specific monitor 320 that corresponds to the activity type. The instance of the activity-specific monitor 320 may monitor sensor data to determine whether the one or more auto-recording conditions defined in the activity-specific monitor 320 are met. When the auto-recording conditions are met, the instance of the activity-specific monitor 320 issues a notification to the auto-recording module 316 to begin writing the media data to persistent storage 308.

The instance of the activity-specific monitor 320 may also determine when to stop recording the video data and audio data. In some implementations, the activity-specific monitor 320 may issue a stop notification when a predetermined amount of record time has lapsed (e.g., thirty seconds). In some implementations, the activity-specific monitor 320 may determine whether one or more particular auto-recording conditions are no longer met. For example, if the video data no longer corresponds to the scene description, the activity-specific monitor 320 can issue a stop notification to the auto-recording module 316. In some implementations, the activity-specific monitor 320 may include stop conditions. A stop condition may be a condition that, when met, causes the activity-specific monitor 320 to issue a stop notification. For example, for the snowboarding/skiing activity-specific monitor 320-1, if the velocity of the image capture system 300 goes to zero for more than a predetermined period of time (e.g., two seconds), the activity-specific monitor 320 may consider the stop condition met and may issue a stop notification.

By encapsulating activity-specific monitors 320 into respective objects, the image capture system 300 may be easily updated to add new activity types to monitor for. For example, the image capture system 300 may be updated at a later time to include a snowmobiling activity-specific monitor. Furthermore, in these implementations, the activity-specific monitors 320 may be a more efficient allocation of the computing resources of a processor.

In some implementations, the auto-capture module 316 may include one or more embedded machine-learning tools. For example, the auto-capture module 316 may utilize a Visual Processing Unit (VPU) and/or Convolutional Neural Network (CNN). In these implementations, the auto-capture module 316 in combination with an activity-specific monitor 320 may implement machine-learning techniques to determine whether a user is actively engaging in a specific-activity.

Figure 4:
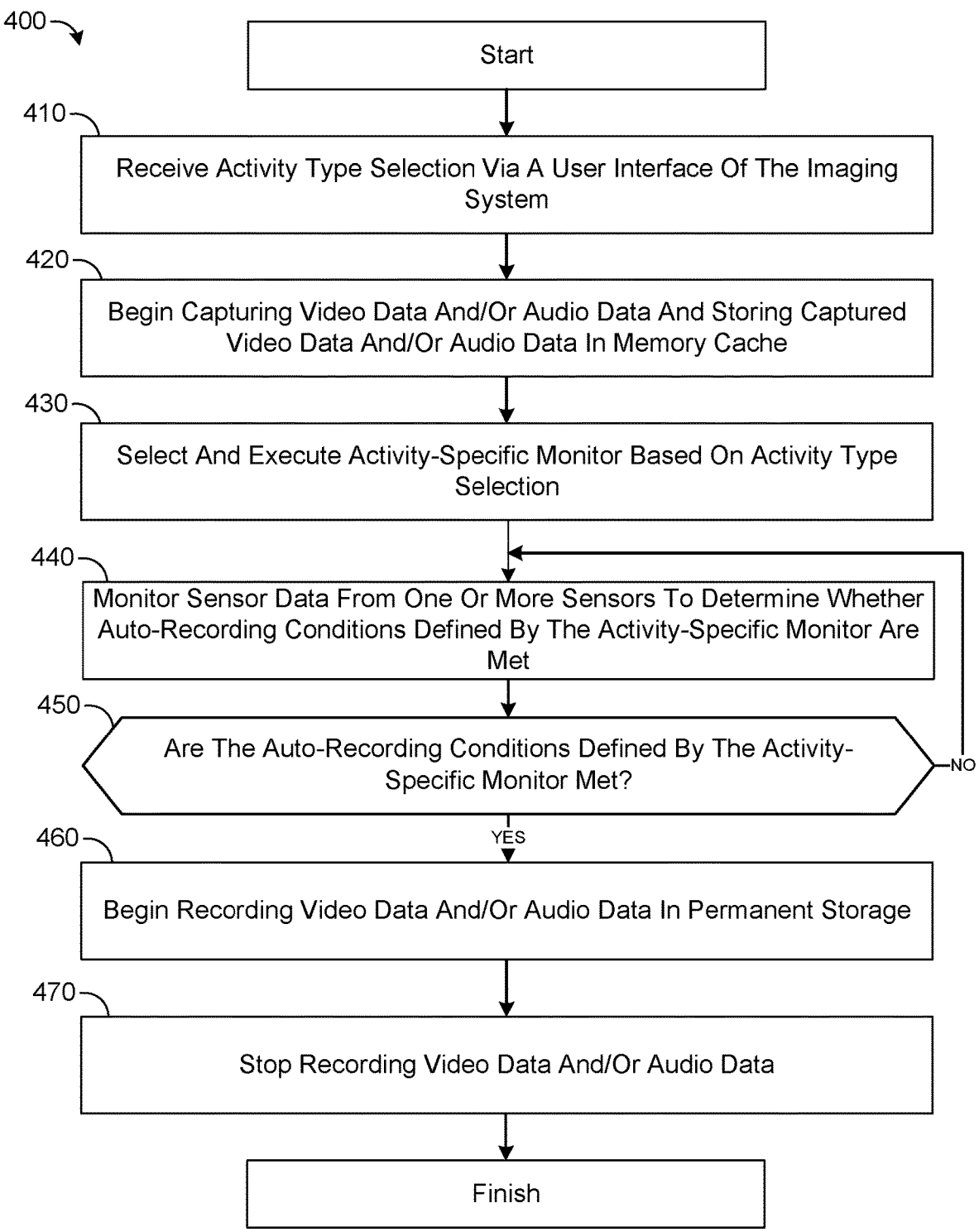
FIG. 4 is a flow chart illustrating an example set of operations of a method for automatically recording media data according to some implementations of the present disclosure.

FIG. 4 illustrates an example set of operations of a method 400 for auto-recording media data. While reference is made to the image capture system 300 of FIG. 3, the method 400 may be performed on any suitable image capture system. Auto-recording media data may refer to the storage of captured media data without an explicit command from the user of the image capture system 300 to begin such recoding.

At 410, the image capture system 300 receives an activity type selection via a user interface 312 of the image capture system 300. As previously discussed, the activity type selection may be received via a UI 312 that is provided on the actual image capture device or via a user interface of a connected secondary device (e.g., a graphical user interface displayed by a smartphone). The activity type may designate one of a plurality of activity types, where each of the activity types has a corresponding activity-specific monitor associated therewith.

At 420, the image capture system 300 begins capturing media data (e.g., video data and/or audio data) and storing the captured media data in a memory cache 306. In some implementations, the image capture system 300 may begin capturing the media data upon receiving the activity type selection. In these implementations, the selection of an activity type may indicate the desire to initiate the auto-recording feature of the image capture system 300. In response to initiating the auto-recording feature, the image capture system 300 may begin capturing media data. The media data may be encoded by the encoding module 304 and may be stored in the memory cache 306. For instance, the image sensor 302 may begin capturing video data and may output the captured video data to a respective video encoder. Additionally or alternatively, the audio component 310 may begin capturing audio data and may output the captured audio data to a respective audio encoder. In some implementations, the respective encoders may output the encoded media data into the memory cache 306.

At 430, the image capture system 300 selects and executes an activity-specific monitor 320 based on the activity type selection. In some implementations, the auto-recording module 316 executes the activity-specific monitor 320 by retrieving and instantiating an instance of an activity-specific monitor 320 corresponding to the activity type selection. In some implementations, the auto-recording module 316 calls a process that defines the activity-specific monitor using the activity type selection.

At 440, the image capture system 300 monitors sensor data from one or more sensors to determine whether auto-recording conditions defined by the activity-specific monitor 320 are met. In some implementations, a respective activity-specific monitor 320 may define sensor data from a set of one or more sensors to monitor as well as auto-recording conditions that trigger the auto-recording features. As was discussed, each activity-specific monitor 320 may define specific sensor data to monitor as well as auto-recording conditions relating to the sensor data that correspond to the activity. For example, the surfing activity-specific monitor 320-2 will define different auto-recording conditions than a parachuting/wingsuit activity-specific monitor. In another example, the snowboarding/skiing activity-specific monitor 320-1 will define different auto-recording conditions than a motorcycling activity-specific monitor. Examples implementations of activity-specific monitors 320 are provided in greater detail below.

At 450, the image capture system 330 determines whether the auto-recording conditions defined by the activity-specific monitor 320 are met. The auto-recording conditions may include scene descriptions, measurement thresholds, audio profiles, and the like. For example, scene descriptions for snowboarding/skiing may define pixel values for at least the lower quarter of each frame that correspond to the color of snow (e.g., white or gray). Similarly, scene descriptions for motorcycling or other road-related activities may define pixel values and pixel locations that correspond to scenes having roads (e.g., gray or black pixels located in the middle of frames). Measurement thresholds may relate to any measurable values that may be indicative of an activity. For example, a measurement threshold for a parachuting/wingsuit activity may define an acceleration threshold that is very high (e.g., >8 m/s2). For a motorcycling activity, an acceleration threshold may be less than parachuting, but greater than other activities (e.g., >4 m/s2). Measurement thresholds may further define thresholds for velocities, luminance, pressure, temperature, or the like. Audio profiles may define features of a captured audio signal that may be indicative of a particular activity. For example, the snowboarding/skiing activity-specific monitor 320-1 may define an audio profile that includes audio frequencies corresponding to the sound of wind being captured by the audio component. In another example, a scuba diving/snorkeling activity-specific monitor can define an audio profile that includes audio frequencies corresponding to bubbles being exhaled by a user. Other activity-specific monitors 320 may implement alternative audio profiles. Different examples of activity-specific monitors 320 are provided in greater detail below.

To the extent that each of the auto-recording conditions are met, the image capture system 300 begins recording the media data in the persistent storage 308 of the image capture system 300 as shown at 460. In some implementations, the auto-recording module 316 receives a notification from the activity-specific monitor 320 to begin recording the media data and instructs the encoding module 304 to begin writing the media data to the persistent storage 308 of the image capture system 300. In some of these implementations, the encoding module 304 begins outputting the media data to persistent storage 308 on the image capture device. In other implementations, the encoding module 304 outputs the media data to a communication interface that transmits the media data to the secondary device (e.g., a smartphone) that includes persistent storage 308. In these implementations, the secondary device may write the media data to the persistent storage. In some implementations, the auto-recording module 316 can further instruct the memory cache 306 to write any cached media data to the persistent storage 308, so as to capture the seconds of media data before the auto-recording conditions were deemed met, including the media data that caused the auto-recording conditions to be met.

In some implementations, the auto-recording module 316 may create a new file to store the recorded media data. The auto-recording module 316 may generate a filename using a template. For example, the auto-recording module 316 may utilize the activity type, date, and time to generate a file name. In this way, the user can easily find the file at a later time.

At 470, the image capture system 300 can stop recording the media data in the persistent storage 308. In some implementations, the auto-recording module 316 can be configured to stop recording after a predetermined time length (e.g., 30 seconds) or may receive a stop notification from the activity-specific monitor 320 after the predetermined length. Furthermore, the image capture system 300 may be configured to capture multiple media segments that are less than a predetermined length and may combine the multiple media segments into a single media segment that is less than or equal to a predetermined length. In these implementations, the auto-recorded media data may be time-limited, so as to be easily uploaded to social media platforms. In some implementations, the auto-recording module 316 can stop the auto-recording after the activity-specific monitor 320 determines that one or more specific auto-recording conditions are no longer being met. For instance, if the activity-specific monitor 320 detects that the video data no longer corresponds to the scene description, the activity-specific monitor 320 may issue a stop notification to the auto-recording module 316. In some implementations, the auto-recording module 316 can instruct the encoding module 304 to stop recording after the activity-specific monitor 320 determines that a stop condition has been met. For example, the snowboarding/skiing activity-specific monitor 320-1 can monitor a velocity of the image capture system 300 to determine when the velocity of the image capture system 300 is approximately equal to zero for a predetermined period of time (e.g., >2 seconds). Upon determining that this stop condition has been met, the activity-specific monitor 320 may issue a stop notification to the auto-recording module 316. Upon stopping recording, the activity-specific monitor 320 may be configured to continue monitoring the sensor data to determine whether to begin recording again. Alternatively, the auto-recording module 316 may stop executing or un-instantiate the activity-specific monitor.

Figure 5:
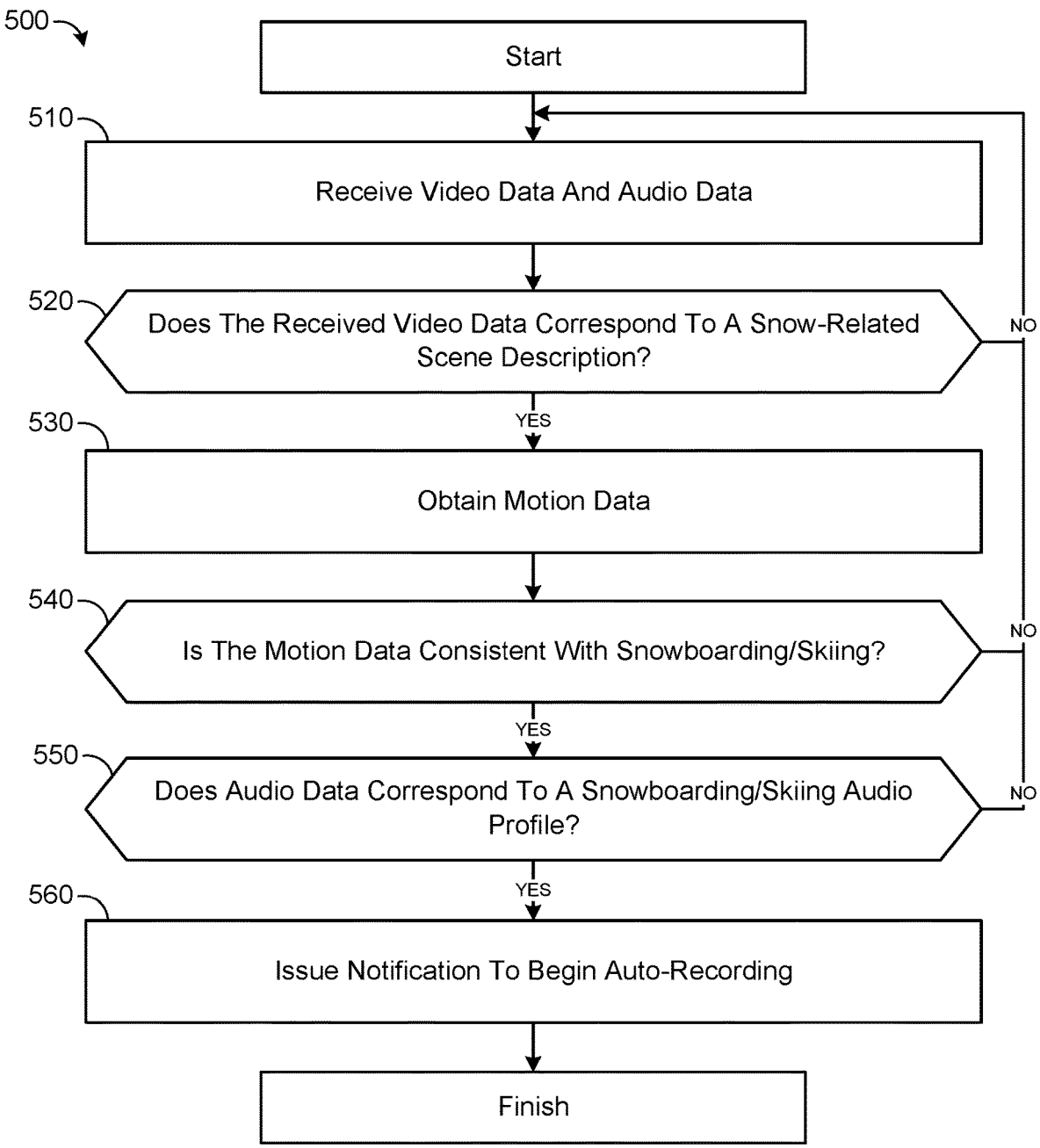
FIG. 5 is a flow chart illustrating an example set of operations of a method for determining when a user is engaged in snowboarding/skiing to automatically record media data according to some implementations of the present disclosure.

FIG. 5 illustrates an example set of operations of a method 500 for determining when a user is actively engaging in snowboarding/skiing to automatically record media data. According to some implementations of the present disclosure, the method 500 may be executed by an instance of the snowboarding/skiing activity-specific monitor 320-1 of FIG. 3. The method is described with respect to the components of FIG. 3. The method 500, however, may be executed by other suitable components without departing from the scope of the disclosure. In some implementations, the method 500 may begin executing when an instance of the snowboarding/skiing activity-specific monitor 320-1 is instantiated by the auto-recording module 316.

At 510, the snowboarding/skiing activity-specific monitor 320-1 receives video data and audio data. The video data may be captured by the image sensor 302. The snowboarding/skiing activity-specific monitor 320-1 may receive the video data from the memory cache 306 or directly from the encoding module 304. The audio data may be captured by the audio component 310. The snowboarding/skiing activity-specific monitor 320-1 may receive the audio data from the memory cache 306 or directly from the encoding module 304.

At 520, the snowboarding/skiing activity-specific monitor 320-1 determines whether the received video data corresponds to a snow-related scene description. A snow-related scene description may include pixel values (e.g., RGB values of pixels) that correspond to the possible colors of snow (e.g., shades of white and/or gray) and predetermined pixel locations where those pixel values are likely to be found (e.g., bottom third or bottom half of a frame). The snowboarding/skiing activity-specific monitor 320-1 may determine the pixel values of the pixels of one or more frames of the video data at the predetermined pixel locations. In some implementations, the snowboarding/skiing activity-specific monitor 320-1 may determine whether a certain percentage (e.g., >60%) of those pixel values match the pixel values that correspond to the possible colors of snow. When the percentage of pixels at the predetermined pixel locations have pixel values that correspond to the possible colors of snow is greater than a percentage threshold (e.g., 60%), the snowboarding/skiing activity-specific monitor 320-1 can determine that it is likely that the video data corresponds to a snow-related scene description. In this scenario, the snowboarding/skiing activity-specific monitor 320-1 may monitor additional sensor data captured by the image capture system 300. Otherwise, the snowboarding/skiing activity-specific monitor 320-1 can continue to monitor the video data. It is noted that the snowboarding/skiing activity-specific monitor 320-1 may determine whether the video data corresponds to a snow-related scene description in other suitable manners as well.

At 530, the snowboarding/skiing activity-specific monitor 320-1 obtains motion data determined by the image capture system 300 (e.g., an acceleration and/or a velocity of the image capture system 300). The snowboarding/skiing activity-specific monitor 320-1 may receive the motion data of the image capture system 300 from the metadata sensors 314. For example, the snowboarding/skiing activity-specific monitor 320-1 may receive signals from an accelerometer, a gyroscope, and/or a GPS sensor to determine the acceleration and/or velocity of the image capture system 300.

At 540, the snowboarding/skiing activity-specific monitor 320-1 determines whether the motion data is consistent with snowboarding/skiing. For example, the snowboarding/skiing activity-specific monitor 320-1 may determine whether the acceleration is greater than an acceleration threshold and/or whether the velocity is greater than a velocity threshold. The acceleration threshold may be a value that is attributed to the accelerations of an average snowboarder or skier. Similarly, the velocity threshold may be a value that is attributed to an average snowboarder or skier. If the acceleration is greater than an acceleration threshold and/or the velocity is greater than a velocity threshold, the snowboarding/skiing activity-specific monitor 320-1 can monitor additional sensor data captured by the image capture system 300. Otherwise, the snowboarding/skiing activity-specific monitor 320-1 can return to monitoring the video data to ensure the video data still correlates to the snow-related scene description. For example, the user may have been merely moving towards a ski-lift, such that the activity-specific monitor 320-1 waits until the user is back on snow.

At 550, the snowboarding/skiing activity-specific monitor 320-1 determines whether the audio data corresponds to a snowboarding/skiing audio profile. An audio profile may define sounds that are expected to be picked up by the audio component 310 when someone is engaging in a specific activity. Thus, in the case of snowboarding/skiing, the audio profile may define audible frequencies that correlate with the sound of wind being captured by the audio component 310. Thus, in some implementations, the snowboarding/skiing activity-specific monitor 320-1 can analyze the audio data to determine whether the audio data includes frequencies that are consistent with the sound of wind. In these implementations, the audio data may be converted into the frequency domain to determine whether the audio data contains frequencies that are consistent with the sounds of wind being captured by the audio component 310. If the audio data corresponds to a snowboarding/skiing audio profile, the snowboarding/skiing activity-specific monitor 320-1 can issue a notification to begin auto-recording to the auto-recording module 316, as shown at 560. Otherwise, the snowboarding/skiing activity-specific monitor 320-1 can return to monitoring the video data to ensure the video data still correlates to the scene description.

The method 500 of FIG. 5 is provided for example only. The snowboarding/skiing activity-specific monitor 320-1 can determine that the user is likely engaging in snowboarding or skiing in other suitable manners. Furthermore, the snowboarding/skiing activity-specific monitor 320-1 may be further configured to determine when to issue a stop notification, as was discussed above.

Figure 6:
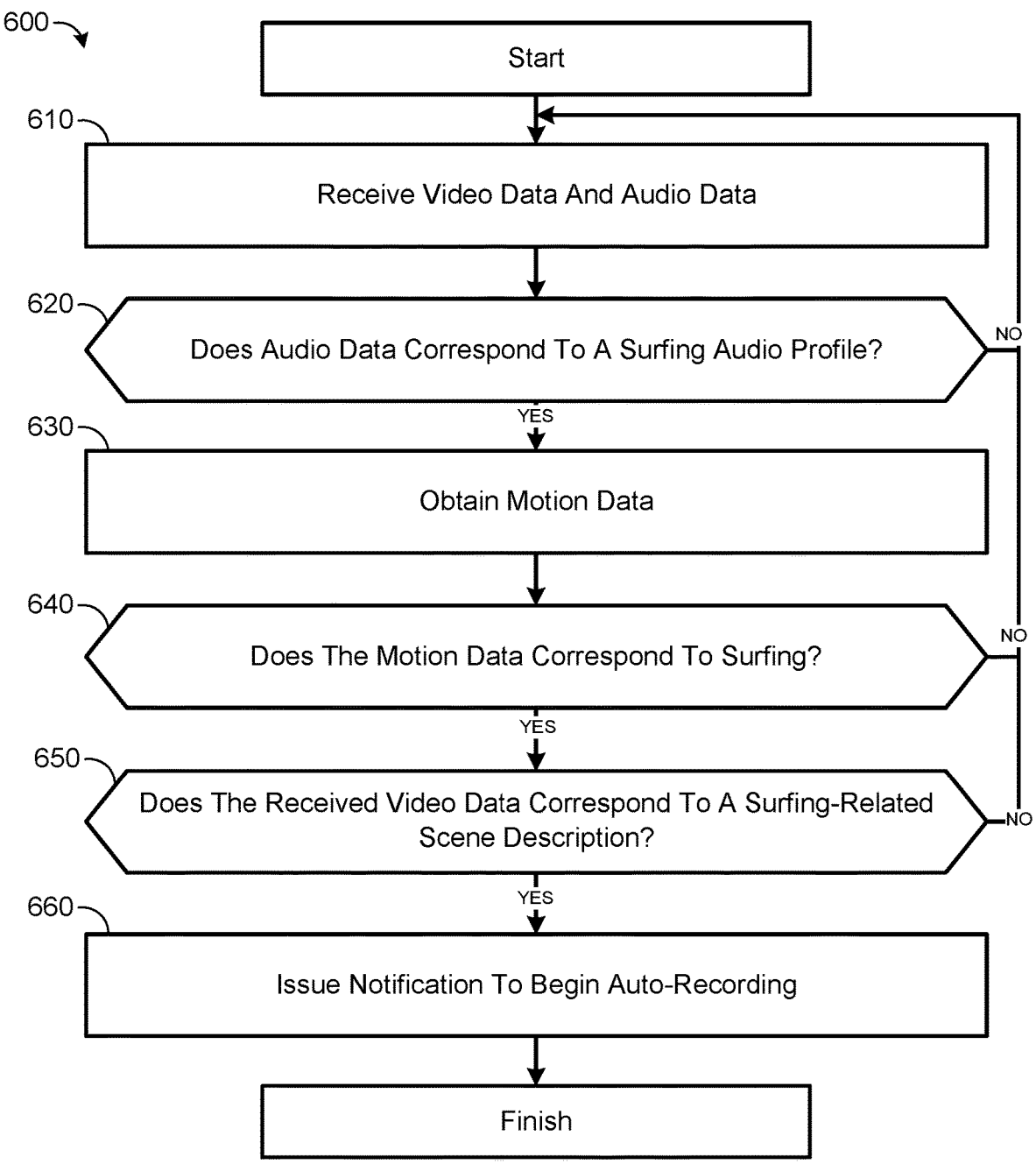
FIG. 6 is a flow chart illustrating an example set of operations of a method for determining when a user is engaged in surfing to automatically record media data according to some implementations of the present disclosure.

FIG. 6 illustrates an example set of operations of a method 600 for determining when a user is engaged in surfing to automatically record media data. According to some implementations of the present disclosure, the method 600 may be executed by an instance of the surfing activity-specific monitor 320-2 of FIG. 3. The method 600 is described with respect to the components of FIG. 3. The method 600, however, may be executed by other suitable components without departing from the scope of the disclosure. In some implementations, the method 600 may begin executing when an instance of the surfing activity-specific monitor 320-2 is instantiated by the auto-recording module 316.

At 610, the surfing activity-specific monitor 320-2 receives video data and audio data. The video data may be captured by the image sensor 302. The surfing activity-specific monitor 320-2 may receive the video data from the memory cache 306 or directly from the encoding module 304. The audio data may be captured by the audio component 310. The surfing activity-specific monitor 320-2 may receive the audio data from the memory cache 306 or directly from the encoding module 304.

At 620, the surfing activity-specific monitor 320-2 determines whether the audio data corresponds to a surfing audio profile. In the case of surfing, the audio profile may define audible frequencies that correlate with the sound of a wave crashing being captured by the audio component 310. Thus, in some implementations, the surfing activity-specific monitor 320-2 can analyze the audio data to determine whether the audio data includes frequencies that are consistent with the sound of waves crashing. In these implementations, the audio data may be converted into the frequency domain to determine whether the audio data contains frequencies that are consistent with the sound of waves being captured by the audio component 310. If the surfing activity-specific monitor 320-2 determines that the audio data correlates to the surfing audio profile, the surfing activity-specific monitor 320-2 may monitor additional sensor data captured by the image capture system 300. Otherwise, the surfing activity-specific monitor 320-2 can continue to monitor the audio data. It is noted that in some implementations, the surfing activity-specific monitor 320-2 may be configured to monitor the audio data before video data because a surfer may be waiting to catch a wave. Therefore, the sound of waves may be observed prior to the surfer actually catching a wave.

At 630, the surfing activity-specific monitor 320-2 obtains motion data corresponding to the image capture system 300. For example, the surfing activity-specific monitor may determine an acceleration and/or a velocity of the image capture system 300. The surfing activity-specific monitor 320-2 may receive the acceleration and/or the velocity of the image capture system 300 from the metadata sensors 314. For example, the surfing activity-specific monitor 320-2 may receive signals from an accelerometer, a gyroscope, and/or a GPS sensor to determine the acceleration and/or velocity of the image capture system 300.

At 640, the surfing activity-specific monitor 320-2 determines whether the acceleration is greater than an acceleration threshold and/or whether the velocity is greater than a velocity threshold. The acceleration threshold may be a value that is attributed to the acceleration of an average surfer. Similarly, the velocity threshold may be a value that is attributed to the velocity of an average surfer. If the acceleration is greater than an acceleration threshold and/or the velocity is greater than a velocity threshold, the surfing activity-specific monitor 320-2 can monitor additional sensor data captured by the image capture system 300. Otherwise, the surfing activity-specific monitor 320-2 can return to monitoring the audio data to ensure the audio data still correlates to the surfing audio profile. For example, the surfer may be waiting to catch a wave, but the audio component 310 has previously picked up the sounds of waves crashing. In this scenario, the surfing activity-specific monitor 320-2 may determine that the surfer has not moved, and is therefore, not actually surfing. In this scenario, the surfing activity-specific monitor 320-2 continues to ensure that the surfer is still in the water by monitoring the audio component 310.

At 650, the surfing activity-specific monitor 320-2 determines whether the received video data corresponds to a surfing-related scene description. A surfing-related scene description may include pixel values (e.g., RGB values of pixels) that correspond to the possible colors of water and waves (e.g., shades of blue, green, and/or white) and predetermined pixel locations where those pixel values are likely to be found (e.g., bottom third or bottom half of a frame). The surfing activity-specific monitor 320-2 may determine the pixel values of the pixels of one or more frames of the video data at the predetermined pixel locations. In some implementations, the surfing activity-specific monitor 320-2 may determine whether a certain percentage (e.g., >60%) of those pixel values match the pixel values that correspond to the possible colors of waves and water. When the percentage of pixels at the predetermined pixel locations have pixel values that correspond to the possible colors of waves and water is greater than a percentage threshold value (e.g., >60%), the surfing activity-specific monitor 320-2 can determine that it is likely that the video data corresponds to a surfing-related scene description. In this scenario, the surfing activity-specific monitor 320-2 can issue a notification to begin auto-recording to the auto-recording module 316, as shown at 660. Otherwise, the surfing activity-specific monitor 320-2 can return to monitoring the audio data to ensure the audio data still correlates to the surfing audio profile.

The method 600 of FIG. 6 is provided for example only. A surfing activity-specific monitor 320-2 can determine that the user is likely engaging in surfing in other suitable manners. Furthermore, the surfing activity-specific monitor

320-2 may be further configured to determine when to issue a stop notification, as was discussed above.

Methods 500 and 600 are provided for example only. It is understood that other activity-specific monitors 320 for different activities may operate in similar manners. Furthermore, the snowboarding/skiing activity-specific monitor 320-1 and the surfing activity-specific monitor 320-2 can be configured in alternative manners without departing from the scope of the disclosure.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared or another type of communication medium. The exact topology of the bus could be, for example, standard "bus," hierarchical bus, network-on-chip, address-event-representation (AER) connection, or other type of communication topology used for accessing, for example, different memories in a system.

As used herein, the term "computer program" or "software" is meant to include any sequence of human or machine cognizable steps which perform a function. Such program may be rendered in virtually any programming language or environment including, for example, C/C++, C#, Fortran, COBOL, MATLAB™, PASCAL, Python, assembly language, markup languages, such as HTML, Standard Generalized Markup Language (SGML), XML, Voice Markup Language (VoxML), as well as object-oriented environments such as the Common Object Request Broker Architecture (CORBA), Java™ (including J2ME, Java Beans), and/or Binary Runtime Environment, such as Binary Runtime Environment for Wireless (BREW).

As used herein, the term "module" may refer to any discrete and/or integrated electronic circuit components that implement analog and/or digital circuits capable of producing the functions attributed to the modules herein. For example, modules may include analog circuits (e.g., amplification circuits, filtering circuits, analog/digital conversion circuits, and/or other signal conditioning circuits). The modules may also include digital circuits (e.g., combinational or sequential logic circuits, memory circuits, etc.). The functions attributed to the modules herein may be embodied as one or more processors, hardware, firmware, software, or any combination thereof. Depiction of different features as modules is intended to highlight different functional aspects and does not necessarily imply that such modules must be realized by separate hardware or software components. Rather, functionality associated with one or more modules may be performed by separate hardware or software components, or integrated within common or separate hardware or software components.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), dynamic random access memory (DRAM), Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory, such as NAND/NOR, memristor memory, and pseudo SRAM (PSRAM).

As used herein, the terms "processor" and "digital processor" are meant generally to include digital processing devices. By way of non-limiting example, digital processing devices may include one or more of digital signal processors (DSPs), reduced instruction set computers (RISC), general-purpose complex instruction set computing (CISC) processors, microprocessors, gate arrays, such as field programmable gate arrays, PLDs, reconfigurable computer fabrics (RCFs), array processors, secure microprocessors, application-specific integrated circuits (ASICs), Visual Processing Units (VPUs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire, such as FW400, FW110, and/or other variations, USB, such as USB2, Ethernet, such as 10/100, 10/100/1000 (Gigabit Ethernet, 10-Gig-E, and/or other Ethernet implementations), MoCA, Coaxsys, such as TVnet™, radio frequency tuner, such as in-band or out-of-band, cable modem, and/or other radio frequency tuner protocol interfaces, Wi-Fi (802.11), WiMAX (802.16), personal area network (PAN), such as 802.15, cellular, such as 3G, LTE/LTE-A/TD-LTE, GSM, and/or other cellular technology, IrDA families, and/or other network interfaces.

As used herein, the term "Wi-Fi" includes one or more of IEEE-Std. 802.11, variants of IEEE-Std. 802.11, standards related to IEEE-Std. 802.11, such as 802.11 a/b/g/n/s/v, and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA)(such as, IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, cellular Digital Packet Data (CDPD), satellite systems, millimeter wave or microwave systems, acoustic, infrared (i.e., IrDA), and/or other wireless interfaces.

As used herein, the terms "camera," or variations thereof, and "image capture device," or variations thereof, may be used to refer to any image capture device or sensor configured to capture, record, and/or convey still and/or video imagery which may be sensitive to visible parts of the electromagnetic spectrum, invisible parts of the electromagnetic spectrum, such as infrared, ultraviolet, and/or other energy, such as pressure waves.

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

What is claimed is:

1. A method for auto-recording data, the method comprising:
   detecting audio data;
   selecting an activity-specific monitor based on an activity type, wherein the selected activity-specific monitor includes an auto-recording condition based on an audio profile associated with the activity type;
   determining whether the audio data corresponds to the audio profile associated with the activity type;
   on a condition that the audio data corresponds to the audio profile associated with the activity type, determining that the auto-recording condition is met; and
   transmitting a notification to begin auto-recording data.

2. The method of claim 1, wherein the auto-recording condition includes a scene description that corresponds to the activity type.

3. The method of claim 2, wherein determining whether the audio data corresponds to the audio profile includes determining whether the audio data corresponds to the scene description.

4. The method of claim 1, wherein the auto-recording condition includes a motion profile associated with the activity type, the method further comprising:
   obtaining motion data;
   determining whether the motion data corresponds to the motion profile associated with the activity type; and
   on a condition that the motion data corresponds to the motion profile associated with the activity type, determining that the auto-recording condition is met.

5. The method of claim 4, wherein the motion data includes an acceleration component, and wherein determining whether the motion data corresponds to the motion profile associated with the activity type includes:
   comparing the acceleration component to an acceleration threshold, the acceleration threshold corresponding to the activity type; and
   determining that the motion data corresponds to the motion profile associated with the activity type when the acceleration component meets the acceleration threshold.

6. The method of claim 4, wherein determining whether the motion data corresponds to the motion profile associated with the activity type includes determining whether the motion data is consistent with a snowboarding activity, a skiing activity, or a surfing activity.

7. The method of claim 1, wherein the audio profile defines a range of audio frequencies attributed to the activity type.

8. The method of claim 7, wherein determining whether the audio data corresponds to the audio profile associated with the activity type includes determining whether an observed audio frequency contained in the audio data is within the range of audio frequencies defined by the audio profile.

9. The method of claim 8, wherein the audio profile corresponds to a snowboarding activity, a skiing activity, or a surfing activity.

10. An image capture system comprising:
    an image sensor configured to obtain video data;
    a processor configured to execute computer-executable instructions, the computer executable instructions causing the processor to:
      select an activity-specific monitor based on an activity type, wherein the selected activity-specific monitor includes an auto-recording condition based on a video profile associated with the activity type;
      determine whether the video data corresponds to the video profile associated with the activity type;
      on a condition that the video data corresponds to the video profile associated with the activity type, determine that the auto-recording condition is met; and
      transmit a notification to begin auto-recording data.

11. The image capture system of claim 10, wherein the auto-recording condition includes a scene description that corresponds to the activity type.

12. The image capture system of claim 10, wherein the auto-recording condition includes a motion profile associated with the activity type, the image capture system further comprising:
    a sensor configured to obtain motion data;
    wherein the processor is further configured to:
      determine whether the motion data corresponds to the motion profile associated with the activity type; and
      on a condition that the motion data corresponds to the motion profile associated with the activity type, determine that the auto-recording condition is met.

13. The image capture system of claim 12, wherein the motion data includes an acceleration component, and the processor is further configured to:
    compare the acceleration component to an acceleration threshold, the acceleration threshold corresponding to the activity type; and
    determine that the motion data corresponds to the motion profile associated with the activity type when the acceleration component meets the acceleration threshold.

14. The image capture system of claim 12, wherein the processor is configured to determine whether the motion data is consistent with a snowboarding activity, a skiing activity, or a surfing activity.

15. The image capture system of claim 10, wherein the video profile defines a threshold pixel value based on a pixel color.

16. The image capture system of claim 15, wherein the threshold pixel value is associated with a location of pixels on a frame.

17. An image capture device comprising:
    an image sensor configured to obtain video data;
    an audio component configured to detect audio data;

a processor configured to:
- select an activity-specific monitor based on an activity type, wherein the selected activity-specific monitor includes an auto-recording condition based on a video profile and an audio profile;
- determine whether the video data corresponds to the video profile;
- determine whether the audio data corresponds to the audio profile; and
- on a condition that the video data corresponds to the video profile and the audio data corresponds to the audio profile, transmit a notification to begin auto-recording data.

18. The image capture device of claim 17, wherein the auto-recording condition includes a motion profile, the image capture device further comprising:
a motion sensor configured to obtain motion data;
wherein the processor is further configured to:
- determine whether the motion data corresponds to the motion profile; and
- on a condition that the motion data corresponds to the motion profile, determine that the auto-recording condition is met.

19. The image capture device of claim 17, wherein the auto-recording condition includes a scene description that corresponds to the activity type.

20. The image capture device of claim 17, wherein the scene description is associated with a snowboarding activity, a skiing activity, or a surfing activity, and wherein the processor is configured to determine whether the motion data is consistent with the scene description.

\* \* \* \* \*